United States Patent
Edwards, Jr. et al.

(10) Patent No.: US 9,800,569 B2
(45) Date of Patent: Oct. 24, 2017

(54) DATA PROTECTION BACKUP AGENT MANAGEMENT

(71) Applicant: INTERNATIONAL BUSINESS MACHINES CORPORATION, Armonk, NY (US)

(72) Inventors: Robert C. Edwards, Jr., Susquehanna, PA (US); Avishai H. Hochberg, San Jose, CA (US); Jawed Iqbal, San Jose, CA (US); Tai W. Nam, Apex, NC (US); Joanne T. Nguyen, Saratoga, CA (US); Neil G. Rasmussen, Livermore, CA (US); James P. Smith, Redwood City, CA (US); Peter B. Symonds, Portola Valley, CA (US); Jean X. Yu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/296,760

(22) Filed: Jun. 5, 2014

(65) Prior Publication Data
US 2015/0358309 A1    Dec. 10, 2015

(51) Int. Cl.
*H04L 29/06* (2006.01)
*G06F 21/62* (2013.01)
(Continued)

(52) U.S. Cl.
CPC ........ *H04L 63/083* (2013.01); *G06F 11/1402* (2013.01); *G06F 17/30292* (2013.01);
(Continued)

(58) Field of Classification Search
CPC ..... H04L 63/10; H04L 63/104; H04L 63/105; H04L 63/083; G06F 21/31;
(Continued)

(56) References Cited

U.S. PATENT DOCUMENTS 5,832,211 A * 11/1998 Blakley et al. .................. 726/6
5,913,217 A *  6/1999 Alger ................ G06F 17/30949
                                                707/693

(Continued)

OTHER PUBLICATIONS

Leach et al. "A Universally Unique IDentifier (UUID) URN Namespace", Request for Comments 4122. Jul. 2005. 32 pgs.*

*Primary Examiner* — Zachary A Davis
(74) *Attorney, Agent, or Firm* — Matthew C. Zehrer

(57) ABSTRACT

During a data protection operation, a system exploits a virtual hierarchy to centralize the configuration and management of operating system credentials of numerous virtual guests. For each virtual guest, the system uses the credential to collect a single Globally Unique Identifier (GUID) previously generated and stored in-guest by any data protection agent. The system stores the collected GUID as a custom property in the context of the virtual hierarchy. The system also exploits the virtual hierarchy custom properties to determine if GUIDs are copies due to virtual guest replication. The system ensures GUID uniqueness by requesting regeneration of the GUID by in-guest data protection agents. Using GUIDs that are unique across the virtual hierarchy, the system can correlate application data of multiple in-guest data protection agents.

6 Claims, 9 Drawing Sheets

(51) Int. Cl.
*G06F 9/455* (2006.01)
*G06F 17/30* (2006.01)
*G06F 11/14* (2006.01)

(52) U.S. Cl.
CPC ........ *G06F 21/6272* (2013.01); *H04L 63/104* (2013.01); *H04L 63/105* (2013.01); *G06F 2009/45587* (2013.01); *H04L 63/20* (2013.01)

(58) Field of Classification Search
CPC .. G06F 21/6218; G06F 21/6272; G06F 21/62; G06F 9/45533; G06F 2009/4557; G06F 2009/45587
See application file for complete search history.

(56) References Cited

U.S. PATENT DOCUMENTS

| | | | |
|---|---|---|---|
| 7,546,323 B1 | 6/2009 | Timmins et al. | |
| 7,554,924 B1 * | 6/2009 | Shapiro | H04L 29/12264 370/242 |
| 7,917,617 B1 | 3/2011 | Ponnapur et al. | |
| 7,970,943 B2 * | 6/2011 | Lin | G06F 17/30569 707/602 |
| 8,209,680 B1 * | 6/2012 | Le | G06F 17/30067 713/1 |
| 8,234,640 B1 * | 7/2012 | Fitzgerald | G06F 21/53 718/1 |
| 8,255,508 B2 | 8/2012 | Kern | |
| 8,443,166 B2 | 5/2013 | Czezatke et al. | |
| 8,473,594 B2 * | 6/2013 | Astete et al. | 709/223 |
| 8,489,890 B2 | 7/2013 | Darbha et al. | |
| 8,554,730 B2 * | 10/2013 | Mujumdar | G06F 17/30578 707/626 |
| 8,578,076 B2 * | 11/2013 | van der Linden et al. | 710/72 |
| 9,083,766 B2 * | 7/2015 | Hunter | |
| 9,286,102 B1 * | 3/2016 | Harel | G06F 9/45558 |
| 9,465,877 B2 * | 10/2016 | Hunter | G06F 17/30091 |
| 2006/0123056 A1 | 6/2006 | Darbha et al. | |
| 2009/0182928 A1 | 7/2009 | Becker et al. | |
| 2013/0111349 A1 | 5/2013 | Yan et al. | |

* cited by examiner

| password grouping use case examples | use case requirement description | Design | |
|---|---|---|---|
| | | GM custom attributes | inventory hierarchy |
| one credential per datacenter | I want to configure a single credential used by all GMs in a datacenter for the purpose of guest operations | password_domain_scope=datacenter password_domain_name=<datacenter_name> | <datacenter_name> |
| one credential per cluster | I want to configure a single credential to be used by all GMs in a cluster in a datacenter for the purpose of guest operations | password_domain_scope=cluster password_domain_name=cluster_name | <datacenter_name> -> <cluster_name> |
| one credential per host | I want to configure a single credential to be used by all GMs in a hostsystem in a datacenter for the purpose of guest operations. | password_domain_scope=hostsystem password_domain_name=<host_name> | <datacenter_name> -> <cluster_name> -> <host_name> |
| one credential per vApp | I want to configure a single credential to be used by all GMs in a vApp for the purpose of guest operations | password_domain_scope=vApp password_domain_name=<vApp_name> | <datacenter_name> -> <cluster_name> -> <vApp_name> |
| one credential per resourcepool | I want to configure a single credential to be used by all GMs in a ResourcePool for the purpose of guest operations. | password_domain_scope=resourcepool password_domain_name=<resourcepool_name> | <datacenter_name> -> <cluster_name> -> <resourcepool_name> |
| one credential per user-defined sub-group in a host | I want to divide GMs in a hostsystem into user defined sub-groups, in each of which GMs share the same credential. | password_domain_scope=hostsystem password_domain_name=<host_name> user_defined_group=<user_defined_group_name> | <datacenter_name> -> <cluster_name> -> <user_defined_group_name> |
| one credential per GM | I want to configure a credential for a GM for the purpose of guest operations | password_domain_scope=gm password_domain_name=<gm_name> | <datacenter_name> -> <cluster_name> -> <gm_name> |

FIG. 8

| Attributes | | |
|---|---|---|
| Click Add to add a custom attribute. | | |
| Name | Value | Type |
| Agents Installed | DP for SQL 7.1, Backup Archive Client 7.1 | Virtual Machine |
| Applications Installed | MS SQL 2008 | Virtual Machine |
| Correlation ID | 99 7b 0c 20 20 0c 11 e1 ac b1 00 50 56 ac 22 ec | Virtual Machine |
| Credential Domain Name | vApp: Active Directory | Virtual Machine |
| Injected Program Name | VMScanner | Virtual Machine |
| Injected Program Version | 1.0.0 | Virtual Machine |

FIG. 11

DATA PROTECTION BACKUP AGENT MANAGEMENT

FIELD OF THE INVENTION

Embodiments of the invention generally relate to computer systems and more particularly to the coordination of in-host data backup agents and off-host data backup agents.

DESCRIPTION OF THE RELATED ART

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data. A server is a computer system that responds to requests across a computer network to provide, or help to provide, a network service. Servers can be run on a dedicated computer or by multiple networked computers capable of hosting servers. In many cases, a server can provide several services and have several server instances in operation. Exemplary servers are database servers, file servers, mail servers, print servers, web servers, gaming servers, application servers, etc.

Increasingly common is the utilization of virtual servers that are created by partitioning a single server to appear as multiple servers. The physical server typically runs a hypervisor, virtualizer, etc. which is tasked with creating, releasing, and managing the resources of "guest" operating systems, or virtual machines. These virtual servers are allocated a share of resources of the physical server. The virtual servers are generally aware of only the physical resources allocated to each virtual server by the hypervisor.

A data backup, or the process of backing up, generally refers to the copying and archiving of computer system data so it may be used to restore the original data if necessary. In a virtual server environment, data associated with the virtual server may be backed up utilizing a backup agent included within the virtual server (in-guest agent), data associated with one or more virtual servers may be backed up utilizing a backup agent within the physical server associated with the virtual server (in-host agent), data associated with one or more virtual servers may be backed up utilizing a backup agent outside of the physical server associated with the virtual server (off-host agent), or such data may be backed up utilizing a combination of backup agents. Coordination between or the management of the data backup when utilizing various backup agents is difficult.

SUMMARY

In an embodiment of the present invention, a method for managing in-guest data protection agents, in-host data protection agents, and off-host data protection agents within a virtualized computing environment comprising a plurality of computing resources includes receiving, at a client of a management server, a Correlation GUID Attribute associated with a name of a guest machine; receiving, at the client of the management server, a request for data protection operations associated with one or more particular computing resources; receiving, at the client of the management server, Password Management Attributes and computing resources hierarchy location information associated with the one or more particular computing resources; querying, at the client of the management server, a credential repository to determine a name of the one or more particular resources and a password associated with the one or more particular computing resources; creating, at the client of the management server, a Credential Object comprising the name and the password; and sending, at the client of the management server, the Credential Object to an in-guest data protection agent, an in-host data protection agent, or an off-host data protection agent to manage in-guest data protection operations, in-host data protection operations, or off-host data protection operations, respectively.

In another embodiment of the present invention, a computer program product manages in-guest data protection agents, in-host data protection agents, and off-host data protection agents within a virtualized computing environment comprising a plurality of computing resources. The computer program product comprises a computer readable storage medium having program instructions embodied therewith, the program instructions readable by a processor, to cause the processor to: receive, at a client of a management server, a Correlation GUID Attribute associated with a name of a guest machine; receive, at the client of the management server, a request for data protection operations associated with one or more particular computing resources; receive, at the client of the management server, Password Management Attributes and computing resources hierarchy location information associated with the one or more particular computing resources; query, at the client of the management server, a credential repository to determine a name of the one or more particular resources and a password associated with the one or more particular computing resources; create, at the client of the management server, a Credential Object comprising the name and the password; and send, at the client of the management server, the Credential Object to an in-guest data protection agent, an in-host data protection agent, or an off-host data protection agent to manage in-guest data protection operations, in-host data protection operations, or off-host data protection operations, respectively.

In another embodiment of the present invention a system for managing in-guest data protection agents, in-host data protection agents, and off-host data protection agents within a virtualized computing environment comprising one or more host machines and one or more guest machines. The system comprises a management server and client of the management server. The client of the management server includes a graphical user interface (GUI) that receives a Correlation GUID Attribute associated with a name of a guest machine and receives a request for data protection operations associated with the one or more host machines or the one or more guest machines, a credential repository that stores a group name of the one or more host machines and or one or more guest machines and stores a password associated with the one or more host machines and or one or more guest machines, and one or more data movers that send a Credential Object comprising the group name and the password to an in-guest data protection agent, an in-host data protection agent, or an off-host data protection agent to manage in-guest data protection operations, in-host data protection operations, or off-host data protection operations, respectively. The management server is communicatively connected to the client of the management server and manages the one or more host machines and one or more guest machines and sends Password Management Attributes and computing resources hierarchy location information associated with the one or more host machines or one or more guest machines to the client of the management server.

These and other embodiments, features, aspects, and advantages will become better understood with reference to the following description, appended claims, and accompanying drawings.

BRIEF DESCRIPTION OF THE DRAWINGS

FIG. 8 depicts exemplary Password Management Attribute and password domain/grouping cases, according to various embodiments of the present invention.

FIG. 11 depicts an exemplary GUI displayed by a backup data reporting agent showing additional custom attributes, according to various embodiments of the present invention.

DETAILED DESCRIPTION

Embodiments of the invention generally relate to computer systems and more particularly to the coordination of in-host data backup agents and off-host data backup agents. According to certain embodiments of the present invention, a system correlates application information from within a virtual guest to an entity managing off-host data protection. During a data protection operation, the system exploits the virtual hierarchy to centralize the configuration and management of operating system credentials of numerous virtual guests. For each virtual guest, the system uses the virtual guest credential to collect a single GUID previously generated and stored in-guest by any data protection agent. The system stores the collected GUID as a custom property in the context of the virtual hierarchy. The system also exploits the virtual hierarchy custom properties to determine if GUIDs are copies due to virtual guest replication. The system ensures GUID uniqueness by requesting regeneration of the GUID by in-guest data protection agents. Using GUIDs that are unique across the virtual hierarchy, from the entity managing off-host data protection, the system can correlate application data of multiple in-guest data protection agents.

Figure 1:
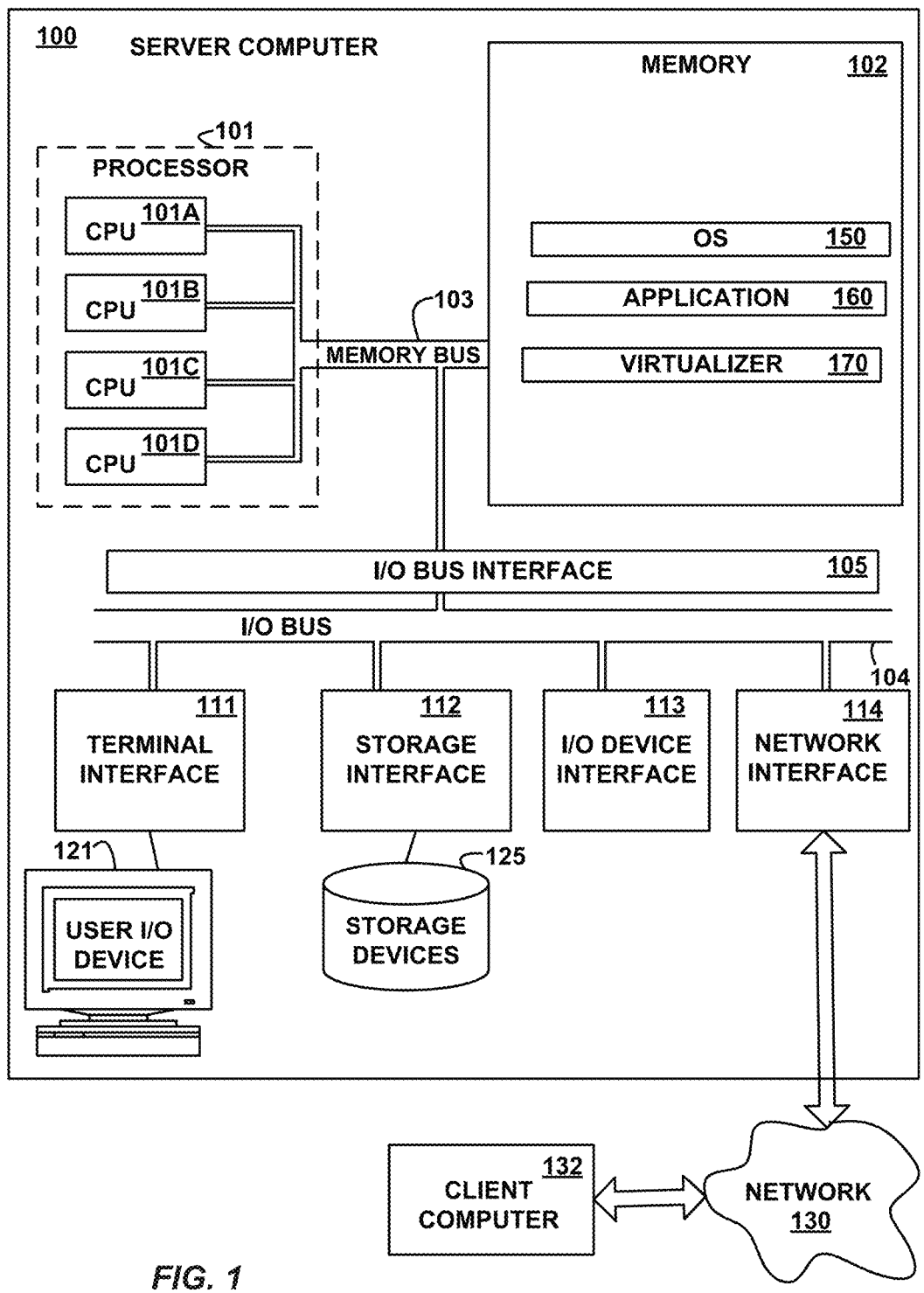
FIG. 1 illustrates a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105. The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an operating system 150, an application 160, emulator or virtualizer 170, etc. Although the operating system 150, an application 160, emulator or virtualizer 170 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities.

Thus, while operating system 150, an application 160, emulator or virtualizer 170 are illustrated as being contained within the main memory 102, these elements are not necessarily all completely contained in the same storage device at the same time. Further, although operating system 150, an application 160, emulator or virtualizer 170 are illustrated as being separate entities, in other embodiments some of them, portions of some of them, or all of them may be packaged together.

In an embodiment, operating system 150, an application 160, emulator or virtualizer 170 comprise instructions or statements that execute on the processor 101 or instructions or statements that are interpreted by instructions or statements that execute on the processor 101, to carry out the functions as further described below with reference to FIGS.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device. The contents of the main memory 102, or any portion thereof, may be stored to and retrieved from the secondary storage devices 125, as needed. The secondary storage devices 125 have a slower access time than does the memory 102, meaning that the time needed to read and/or write data from/to the memory 102 is less than the time needed to read and/or write data from/to for the secondary storage devices 125.

The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130. Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

I/O interface 113 may contain electronic components and logic to adapt or convert data of one protocol on I/O bus 104 to another protocol on another bus. Therefore, I/O interface 113 may connect a wide variety of devices to computer system 100 and to each other such as, but not limited to, tape drives; optical drives; printers; disk controllers; other bus adapters; PCI adapters; workstations using one or more protocols including, but not limited to, Token Ring; Gigabyte Ethernet; Ethernet; Fibre Channel; Serial Storage Architecture (SSA); Fiber Channel Arbitrated Loop (FCAL); Serial Small Computer System Interface (SCSI); Ultra3 SCSI; Infiniband; Fiber Distributed Data Interface (FDDI); Asynchronous Transfer Mode (ATM); 1394; ESCON (Enterprise Systems Connection); wireless relays; Twinax; Local Area Network (LAN) connections; Wide Area Network (WAN) connections; high performance graphics; etc.

In various embodiments, the computer system 100 is a multi-user mainframe computer system, a single-user system, a storage server, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

In an embodiment, the client computer 132 may comprise some or all of the elements of the server computer 100.

FIG. 1 is intended to depict the representative major components of the computer system 100 and the network 130. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
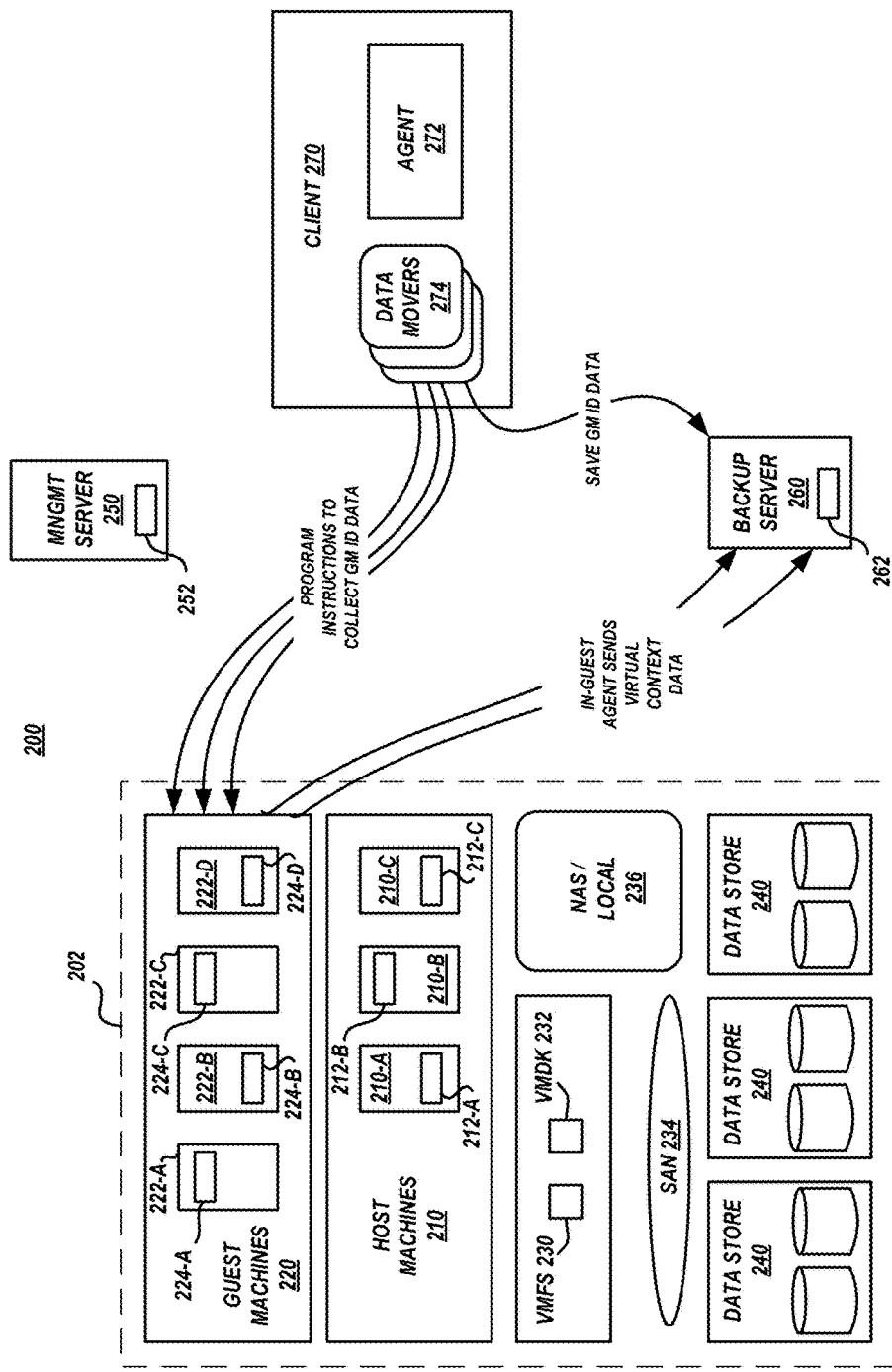
FIG. 2 illustrates an exemplary data protection configuration, according to various embodiments of the present invention.

FIG. 2 illustrates an exemplary data protection configuration 200, according to various embodiments of the present invention. Data protection configuration 200 may include a virtual server environment 202, a management server 250, a backup server 260, and a management server client 270. Management server client 270 is a client of management server 250.

Virtual server environment 202 may include one or more host machines 210, one or more guest machines 220, one or more virtual machine file systems 230, one or more virtual disks 232, a storage area network 234 and/or a network attached storage/local storage interface 236, and one or more data storage devices 240.

The one or more host machines 210 may be e.g. computer system 100 or another data handling system, such as VMware® ESX™, VMware® ESXi™, etc. that includes a hypervisor, such as a virtualizer 170 that creates, releases, and/or manages virtual resources of guest machines 220 (virtual machines, virtual servers, etc.). In various embodiments, a host machine 210 may include an on-host data protection agent 212. The guest machines 220 are allocated a share of resources of the one or more host machines 210 by e.g. virtualizer 170. Each guest machine 220 may run its own copy of an operating system, one or more applications, etc. A particular application may be an in-guest data protection agent 224, such as e.g. Microsoft® Data Protection for SQL Server®, Data Protection for Exchange, etc. hosted on one or more guest machines 220.

In-guest data protection agents are generally called by guest machine 220, local to guest machine 220, installed upon an associated guest machine 220 operating system, etc. The in-guest data protection agent provides for data backup such as a file-level backup or a block-level image backup. Exemplary data that may be protected, copied, or otherwise backed up may be database data, application data, etc. that is associated with a guest machine 220.

On-host data protection agents are generally called by host machine 210, local to host machine 210, installed upon an operating system of host machine 210, etc. but not on upon or within guest machines 220. On-host data protection agents may for example provide guest machine 220 level recallable storage snapshots used for disaster recovery. On-host data protection agents may provide file system backups utilizing multiple snapshots.

VMFS 230 is a file system used by the hypervisor or virtualizer 170 to store virtual machine disk images, including snapshots. Multiple host machines 210 can read/write the VMFS 230 simultaneously. VMFS 230 may be VMware® VMFS®, Network File System (NFS), etc. VMDK 232 is a container used by the hypervisor or virtualizer 170 for virtual hard disk drives to be used by guest machines 220.

In certain embodiments, SAN 234 may be utilized and may be a dedicated network that provides access to block level data storage. SAN 234 may be used to enhance storage devices 240, such as storage devices 125, disk arrays, tape libraries, jukeboxes, etc. accessible to servers so that the devices appear like locally attached devices to the operating system. In certain embodiments, NAS 236 may be utilized and is generally a file-level computer data storage connected to a network providing data access. NAS 236 may be a computer system appliance or a general purpose computer utilized for NAS 236 management. NAS 236 may include one or more storage devices 240 that may be arranged into logical, redundant storage containers such as a RAID array. NAS 236 may provide access to files using network file sharing protocols such as NFS, Server Message Block/Common Internet File System, Apple® Filing Protocol, etc. In certain embodiments, storage devices 240 are included within or otherwise local to the one or more host machines 210.

Management Server 250 is a server that allows for the management of multiple host machines 210 and guest machines 220 through a management console application installed upon e.g. a server client 270. Management Server 250 may provide statistical information about the resource use of each guest machine 220 and provisions the ability to scale and adjust the computational, memory, storage and other resource management functions via the management console application. Management Server 250 may manage the performance of each guest machine 220 against benchmarks and may optimize allocated resources allocated to the guest machines 220 to provide efficiency within the virtual server environment 202. Management Server 250 may also provide security by defining and monitoring access control to and from the guest machines 220, may provide migration of guest machines 220, and may provide interoperability and integration among other network services or systems and other virtual environments 202. Management Server 250 may include an off-host data protection agent 252 that may backup or restore data associated with virtual environment(s) 202. In various embodiments, the client 270 may utilize management server 250 such that management server 250 may host one or more applications or services upon client computer system 270. Client computer system 270 may also include a backup data reporting agent 272 application to correlate and report backup data, backup information, etc. Reporting agent 272 may include a user interface that may be displayed e.g. upon a user I/O device 121 to allow a user to interact with client computer system 270, management server 250, backup server 260, virtual server environment 202, etc. In certain embodiments, management server 250 may be a computer system running VMware® vCenter Server, Microsoft® Hyper-V, etc.

Backup Server 260 is a data backup, data protection, and/or a data recovery server. Backup Server 260 may include a database, relational database, etc. and recovery log (e.g. transaction log, etc.) for storing configuration, statistical information, and object metadata. Data may be managed, stored, etc. via a hierarchy of storage devices. Backup Server 260 may include an off-host data protection agent 262 that may backup or restore data associated with virtual environment(s) 202. In some embodiments client computer system 270 may utilize backup server 260 such that backup server 260 may host one or more applications or services upon client computer system 260. In certain embodiments, backup server 260 may be a computer system 100 running IBM® Tivoli® Storage Manager.

Off-host data protection agents are generally called by a dedicated server (e.g. management server 250, backup server 260, etc.), local to the dedicated server, installed upon an operating system of the dedicated server, etc. Off-host data protection agents may provide guest machine 220 level recallable storage snapshots used for disaster recovery. Off-host data protection agents may also provide file-level recallable storage snapshots used for disaster recovery. Off-host data protection agents may also provide for the management of some backup data at the guest machine 220 and/or host machine 210 level. Data that is backed up by off-host data protection agents may be off loaded from host machines 210 and stored outside of host machine 210 to free the host machines' 210 resources.

As illustrated in FIG. 1, the data protection configuration 200 may include multiple data protection agents located throughout the data protection configuration 200. In-guest data protection agents 224 may be located within guest machines 220. For example, particular in-guest data protection agents 224-A-224D are located within particular guest machines 222-A-222-D, respectively. In-host data protection agents 212 may be located within-host machines 210. For example, data protection agents 212-A-212C are located with host machines 210A-210C, respectively. Off-host data protection agent 252 may be located in management server 250, and/or off-host data protection agent 262 may be located in backup server 260. As a result, backup data associated with such data protection agents is scattered throughout the data protection configuration 200. For example, a particular guest machine 222-A may include data identifying the applications (e.g. Microsoft® SQL, Microsoft® Exchange, Active Directory Domain Controller, Domino, etc.) installed upon or associated with guest machine 220-A. The guest machine 222-A may also include identification data to identify the guest machine 222-A. Another particular guest machine 222-B may include data that assigns disks to functions. For example, guest machine 222-B includes data that assigns the operating system of guest machine 222-B to disk 1, an SQL database name to disk 2, an SQL transaction log to disk 3, and other data to disk 4. Management server 250 may include a multitude of backup data such as a current list of guest machines 220, a state (e.g. power state, tool state, etc.) associated with each guest machine 220, a storage device 240 to file map or table, a storage device 240 to logical unit (LUN) map or table, etc. Further backup server 260 may also include a multitude of backup data such as file space data, activity summary, etc.

In an exemplary correlation scheme of various backup data throughout the data protection configuration 200, data movers 274 included within server client 270 inject program instructions onto guest machines 220 to collect new guest machine 220 ID data (e.g. a list of applications installed on or associated with guest machines 220 and a guest machine 220 ID number, code, etc.) and save the guest machine 220 ID data in backup server 260.

This approach may require backup server 260 changes (e.g. protocol changes, etc.) in each instance new data is needed from guest machines 220. Users of backup server 260 may need to upgrade to a current server version to be able to see the new guest machine 220 ID data. This approach may also require frequent guest machine 220 operations (e.g. code injections, etc.) for new data collection. The application programming interface (API) of some guest machines 220 require connections to the one or more host machines 210 and utilizing many of the resources on the one or more host machines 210. Further, program instructions injected upon guest machines 220 that rely on frequent guest machine 220 operations may interfere with normal operation of the one or more host machines 210.

This approach may also require that guest machines 220 operations require an operating system credential accessible to datamover(s) 274. Since there may be numerous guest machines 220, it may be difficult to manage the large number of associated operating system credentials. For example, management of operating system credentials may include managing password domain configuration (e.g. grouping, etc.), encryption/decryption, storage and retrieval, etc. Furthermore, operating system credentials that are utilized by an off-host agent must be synchronized with the latest updates (both grouping and the actual credentials) from the management server 250.

This approach may also require that the operating system credentials and the grouping information be configured and stored in the same individual data mover 274. Such requirement may force administrators to repeat the same configuration process in each and every data mover 274 whenever a guest machine 220 changes its associated operating system credential (grouping, user name, password reset, etc.). One possible way to reduce the repetitive configuration process is to limit the number of credentials used by guest machines 220. For example, the user could configure guest machines 220 to share a limited number of operating system credentials. However, users may require more flexibility in the usage of credentials.

This approach may also utilize a globally unique identifier (GUID) to link in-guest agents with the associated guest machines 220. The GUID may be stored in the guest machine 220. Difficulties may arise when the guest machine 220 is backed up and restored (i.e. to a new guest machine name, etc.) where the value of the GUID is duplicated in association with the restored guest machine 220. In other words, the original guest machine 220 and the restored guest machine 220 share the same GUID, known as GUID collision.

In the exemplary correlation scheme of various backup data throughout the data protection configuration 200, in-guest agents 224 are improved or upgraded to be aware of virtual context data (e.g., guest machine 220 name, etc.) and to send the virtual context data to backup server 260. This improvement may require an upgrade to all in-guest agents 224 every time new context data is desired. This approach may also require an update to backup server 260 in each instance any new context data is sent from in-guest agents 224. Further, this approach may overload existing backup operations between server 260 and virtual server environment 202. Further, this approach may require a change to the format of backup data which may not be possible as such format changes can impact backup operations and compatibility. Even further, because in-guest agents 224 may backup data in various ways, it may be difficult to synchronize data format changes over the entire population of in-guest agents 224.

Subsequent to saving guest machine 220 ID data and virtual context data in backup server 260, backup server 260 may become a correlated data source. The management server 250 may contain the current guest machine 220 and power state of each guest machine 220. The reporting application 272 may query the management server 250 for the list of guest machines 220 and query the backup server 260 to obtain backup data for each associated guest machine 220. In this approach backup data correlation may be limited to the scope of a single backup server 260 instance. Further, in this approach backup data that is not stored in the backup server 260 may not be supported or available to reporting application 272. Further in this approach, data correlation may interfere with in-guest data protection agent, in-host data protection agent, and/or off-host data protection agent operations. Even further in this approach, if there are multiple backup server 260 instances, each backup server 260 instance may separately store a copy of the backup data associated with guest machines 220. This may cause each backup server 260 instance to separately inject program instructions to guest machines 220 to collect backup data information. This may result in excessive connections to the one or more host machines 210, which may interfere with host operations.

It is therefore an object of the various embodiments of the present invention to correlate the various backup data throughout the data protection configuration 200 to enable a unified and holistic view of the backup data associated with various data protection agents. Such object allows users to determine e.g. what guest machines 220 are hosting applications, how data associated with the guest machines 220 are being backed up (e.g. an in-host data protection agent such as Data Protection for SQL, Data Protection for Exchange, Flash Copy Manager (FCM); or an off-host data protection agent such as Data Protection for VMware®, IBM® Tivoli® Storage Manager, etc.). Such object further allows users to determine where the backup data is located. For example, FCM managed snapshots or backup server 260 snapshots may be aggregately provided. Such object further allows users to determine the scheduling of backups for the various data protection agents, the type of backup (full backup, incremental backup, log backup, etc.), and/or a status of the most recent backup (e.g. successful, failed, etc.). Still further, such object allows users to determine how a guest machine 220 is being protected. For example, whether a VMDK 232 was included, excluded, skipped, etc. by a particular data protection agent, the data type that is being backed up (database data, log data, system data, etc.), and/or whether there is data associated with the guest machine 220 that is not protected by a data protection agent(s), etc.

Thus according to an embodiment of the present invention, a Correlation GUID Attribute is provided to enable a unified and holistic view of the backup data associated with various data protection agents. The Correlation GUID Attribute may be provided to detect and prevent GUID collision in virtual environments and may be utilized to store and manage the GUID associated with various guest machines 220. In certain embodiments, the Correlation GUID Attribute is a VMware® vCenter® custom attribute. In certain embodiments, the Correlation GUID Attribute is a flag, data bit, etc. that when active may indicate the GUID associated with a guest machine 220 is a duplicate and that when inactive may indicate the GUID is not a duplicate. In this manner, ID collision may be detected by querying the Correlation GUID Attribute. If, for example, the Correlation GUID Attribute indicates the GUID is a duplicate, the GUID may be reset, etc.

In certain embodiments, the Correlation GUID Attribute is managed (e.g. activated, deactivated, etc.) via Management Server 250. For example, the Correlation GUID Attribute may be activated by interfacing with management server 250. As such, the scope Correlation GUID Attribute is global across the virtual computer system environment, throughout the data protection configuration 200, etc. In certain embodiments, a particular Correlation GUID Attribute is associated, attached, etc. with a particular guest machine 220. In other words, the Correlation GUID Attribute and the guest machine 220 are linked across the virtual computer system environment, throughout the data protection configuration 200, etc. In certain embodiments, backup data reporting agent 272 may retrieve a Correlation GUID Attribute by querying management server 250. In various embodiments, because the Correlation GUID Attribute is stored or managed within management server 250, the Correlation GUID Attributes associated with various guest machines 220 may be centrally managed and guest machine 220 ID collision may be prevented.

In certain embodiments, the management server client 270 receives a particular Correlation GUID and creates an association, map, or key relationship between the particular Correlation GUID and the associated guest machine, or an identity associated with the guest machine, such as, a guest machine name, etc. In this manner, backup data may be correlated from various data protection agents: in-guest, on-host, or off-host, etc.

According to another embodiment of the present invention, guest machine 220 Password Management Attribute is provided to enable a unified and holistic view of the backup data associated with various data protection agents. In a first aspect of the Password Management Attribute, a group password is defined for a resource hierarchy group associated with multiple guest machines 220. In various embodiments, management server 250 maintains a resource hierarchy which is a representation of the virtual server environment 202 and/or the objects or resources of the virtual server environment 202. For example, VMware® vSphere maintains a resource hierarchy to e.g. know or determine how the resources in the virtual server environment 202 relate to each other. The resource hierarchy may e.g. aid to determine the resource of the virtual server environment 202 in order to manipulate the resource of the virtual server, etc. In certain embodiments, the group password may be defined for a resource hierarchy group associated with all guest machines 220 within virtual server environment 202. In other embodiments, the group password may be defined for a resource hierarchy group associated some of the guest machines within virtual server environment 202. The group password allows for configuration access to associated guest machines within the group. In certain embodiments, server client 270 may access management server 250 to collect the resource hierarchy group password by interfacing with and querying management server 250.

In a second aspect of the Password Management Attribute, the server client 270 creates and includes an internal credential management repository based upon the resource hierarchy within management server 250. In certain embodiments, the credential management repository is a copy of the resource hierarchy stored within management server 250. In various embodiments, the server client 270 synchronizes its credential management repository to mirror changes to e.g. the group password defined for a resource hierarchy group, etc. In certain embodiments, the user may manage the Password Management Attribute using the reporting application 272.

In various embodiments, the resource hierarchy group is defined by recording associated locations of group resources in the resource hierarchy. In other words, a custom attribute may be defined in the resource hierarchy to capture the password grouping. In some instances, the resource hierarchy and attribute(s) may be retrieved in a password set/retrieve map within management server 250. Further, information such as datacenter name, virtual appliance name, cluster name, etc. may be recorded in the resource hierarchy. Further, if more than one group exists within the hierarchy or a child group exists within a parent group within the hierarchy, the applicable group name may be recorded in the hierarchy to identify each applicable group. Because the user may manage the Password Management Attribute using the reporting application 272, the configuration of the Password Configuration Attribute may be accomplished with respect to the resource hierarchy included within management server 250 so as to provide a centralized management location and to provide flexible resource hierarchy grouping assignment.

In certain embodiments, the credential management repository is a copy of the password set/retrieve map stored within management server 250. In other words, server client 270 includes a password data structure mimicking the map. If there are changes in the grouping or password, a set_password operation may update the credential management repository.

According to another embodiment of the present invention, a cross product data repository to reduce data redundancy and reduce the dependency on frequent program instruction injections is provided to enable a unified and holistic view of the backup data associated with various data protection agents. In certain embodiments, similar data collection program instructions are injected to guest machines 220. The data collection program instructions may be activated, called, etc. from e.g. an off-host data protection agent. The data collection program instructions are stored in management server 250 in association with multiple custom attributes. For example, Injected Program Name=VMScanner and Injected Program Version=1.0.0 custom attributes are defined and stored within management server 250. The data collection program instructions provide the following functionality: collect product neutral data, such as applications installed, application versions, Correlation GUID; communicate with management server 250; and store data as management server 250 custom attributes.

In certain embodiments, the data collection program instructions do not require upgrades to traditional data protection agents and machines when new data is required. In various embodiments, the data collection program instructions deployment and upgrade are managed by custom attributes associated with management server 250. In various embodiments, the data collection program instructions need not be removed after each data collection operation, thus reducing the need for repeated code injection and removal operations. In various embodiments, the data that is collected in association with the data collection program instructions is stored as a property of the guest machine 220 and managed by management server 250. As such, redundant copies of the similar data maintained by multiple server instances are reduced.

In this manner the custom attributes associated with virtual machines 220 as managed by management server 250 are utilized as a centralized data sharing mechanism across e.g. multiple backup server 260 server instances. In certain implementations custom attributes may also be utilized to store mapping between virtual disk and application in the credential management repository. Based on the mapping, disk 232 may be excluded from data protection backup operations e.g. if it is known that the disk 232 belongs to an application that is being protected by an in-guest data protection agent. Similarly, a guest machine 220 can be automatically excluded from data protection backup operations e.g. if it is known that the guest machine 220 is being protected by an in-guest data protection agent.

Figure 3:
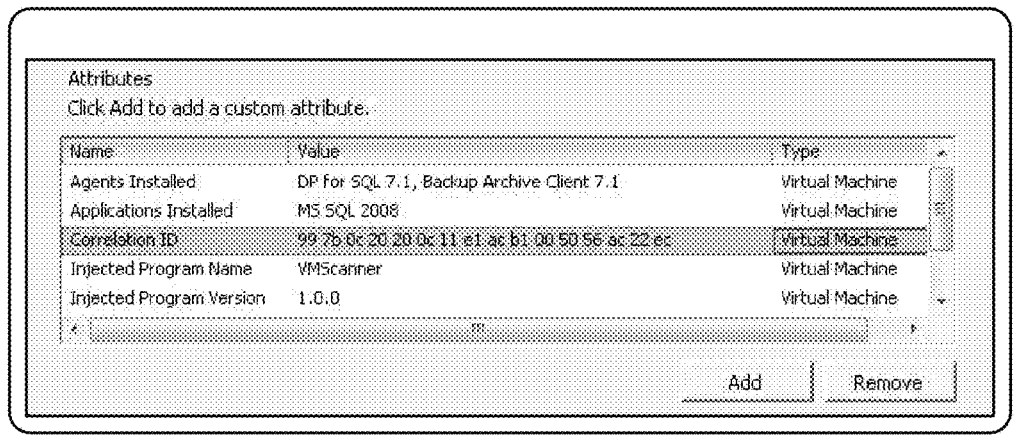
FIG. 3 depicts an exemplary GUI displayed by a backup data reporting agent for setting a Correlation GUID Attribute provided to enable a unified and holistic view of the backup data associated with various data protection agents, according to various embodiments of the present invention.

FIG. 3 depicts an exemplary graphic user interface (GUI) displayed upon backup data reporting agent 272 for setting a Correlation GUID Attribute provided to enable a unified and holistic view of the backup data associated with various data protection agents. The Correlation GUID Attribute is an exemplary custom attribute associated with management server 250.

A custom attribute generally associates user-specific meta-information with guest machines 220 and/or host machines 210. Custom attributes are resources that are monitored and managed for all the host machines 210 and virtual machines 220 in virtual server environment 202 managed by management server 250. In some embodiments, Custom attributes' status and states appear on e.g. a GUI displayed upon backup data reporting agent 272. Subsequent to creating a custom attribute, values may be set for the custom attribute for each virtual machine 220 or host machine 210, as appropriate. Such values may be stored within management server 250. A custom attribute may be utilized to e.g. filter information about virtual machine 220 or host machine 210. For example, a custom attribute may be created for a user's name, "John." Via the GUI displayed upon backup data reporting agent 272, a custom attribute, John, may be added and associated to each applicable product entry and a column title Name may be engaged to sort alphabetically to one or more of the views.

Likewise, Correlation GUID Attribute may be created by adding a custom attribute to the GUI displayed upon backup data reporting agent 272. Values may be added to the attribute by e.g. management server 250.

Figure 4:
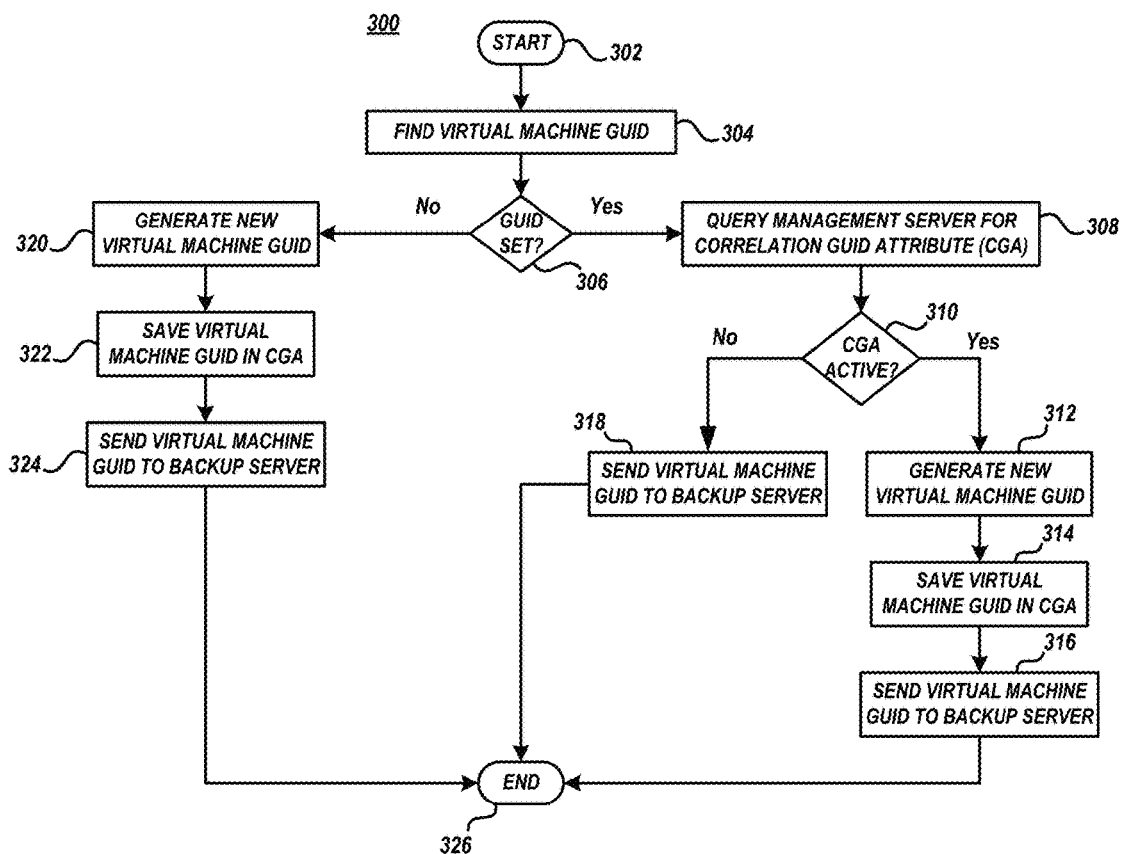
FIG. 4 depicts an exemplary flow diagram of a method for utilizing the Correlation GUID Attribute to eliminate virtual machine GUID collision, according to various embodiments of the present invention.

FIG. 4 depicts an exemplary flow diagram of a method 300 for utilizing the Correlation GUID Attribute to eliminate virtual machine GUID collision. Method 300 begins at block 302 and continues with querying management server 250 to determine a GUID for a virtual machine 220 (block 304). It is determined whether the virtual machine 220 GUID is set at management server 250 (block 306).

To prevent virtual machine 220 GUID collision, management server 250 is queried to determine the Correlation GUID Attribute associated with the particular virtual machine 220 (block 308). Management Server 250 determines whether the Correlation GUID Attribute is active or inactive (block 310). For example, the Correlation GUID Attribute may be inactive if the Correlation GUID Attribute is a null set and the Correlation GUID Attribute is active if the Correlation GUID Attribute is not a null set. If the Correlation GUID Attribute is active it indicates that the particular virtual machine 220 GUID is similar to another virtual machine 220 GUID (i.e. virtual machine 220 GUID collision). Therefore, if it is determined that the Correlation GUID Attribute is active, management server 220 generates a new virtual machine 220 GUID and assigns the new virtual machine 220 GUID to the virtual machine 220 (block 312). The management server 250 associates the new virtual machine 220 GUID with a Correlation GUID Attribute (block 314). For example, the new virtual machine 220 GUID is associated with an inactive Correlation GUID Attribute. The management server 250 sends the new virtual machine 220 GUID to backup server 260 (block 316). If the Correlation GUID Attribute is inactive the particular virtual machine 220 GUID is not similar to another virtual machine 220 GUID and the current virtual machine GUID may be sent to backup server 260 (block 318).

If the virtual machine 220 GUID is not set (at block 306), management server 220 generates a new virtual machine 220 GUID and assigns the new virtual machine 220 GUID to the virtual machine 220 (block 320). The management server 250 associates the new virtual machine 220 GUID with a Correlation GUID Attribute (block 322). The management server 250 sends the new virtual machine 220 GUID to backup server 260 (block 324). Method 300 ends at block 326.

Figure 5:
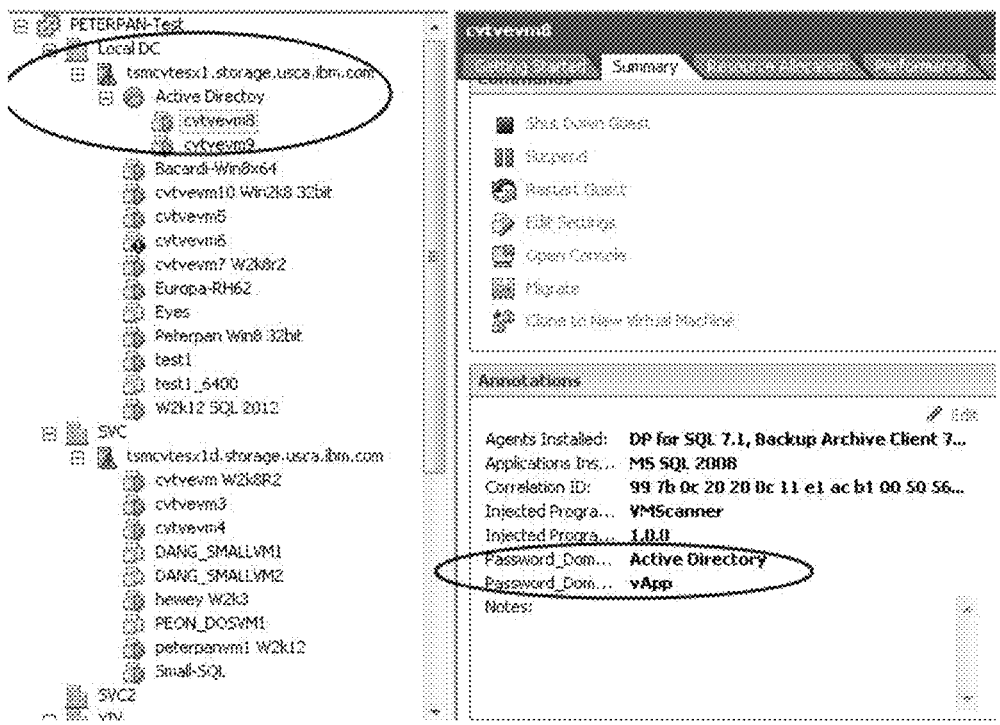
FIG. 5 depicts an exemplary GUI displayed by a data reporting agent depicting Password Management Attributes provided to enable a unified and holistic view of the backup data associated with various data protection agents, according to various embodiments of the present invention.
Figure 6:
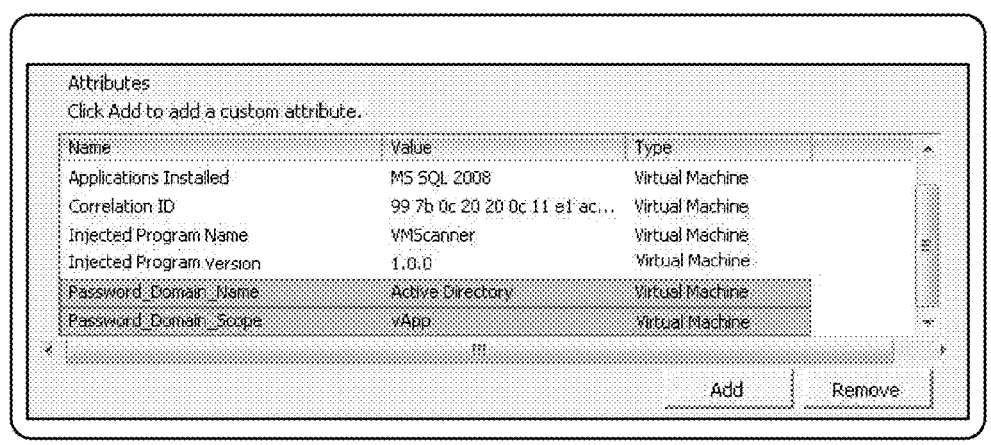
FIG. 6 depicts an exemplary GUI displayed by a backup data reporting agent for setting Password Management Attributes provided to enable a unified and holistic view of the backup data associated with various data protection agents, according to various embodiments of the present invention.

FIG. 5 depicts an exemplary GUI associated with backup data reporting agent 272 depicting Password Management Attributes provided to enable a unified and holistic view of the backup data associated with various data protection agents. The exemplary GUI shows a resource hierarchy where a particular virtual machine 220, named "cvtvevm8," is under virtual server environment 202, named "Local DC," and inside a vApp named "Active Directory". If all the virtual machines 220 in the "Active Directory" vApp share the same group password for guest operations, the group password is saved by recording the scope and the name of the password domain in two exemplary custom attributes, named Password Management Attributes, Password_Domain_Scope=vApp and Password_Domain_Name=Active Directory, respectively. The Password Management Attributes may be saved in the management server 250. In various embodiments, the Password Management Attributes can be created using the server client GUI as is shown in FIG. 6. Subsequent to creating the custom Password Management Attributes, values may be set for the custom attributes associated with applicable virtual machine 220 or host machine 210. Such values may be stored within management server 250. In other embodiments, the Password Management Attributes may be created utilizing the interface to management server 250.

Figure 7:
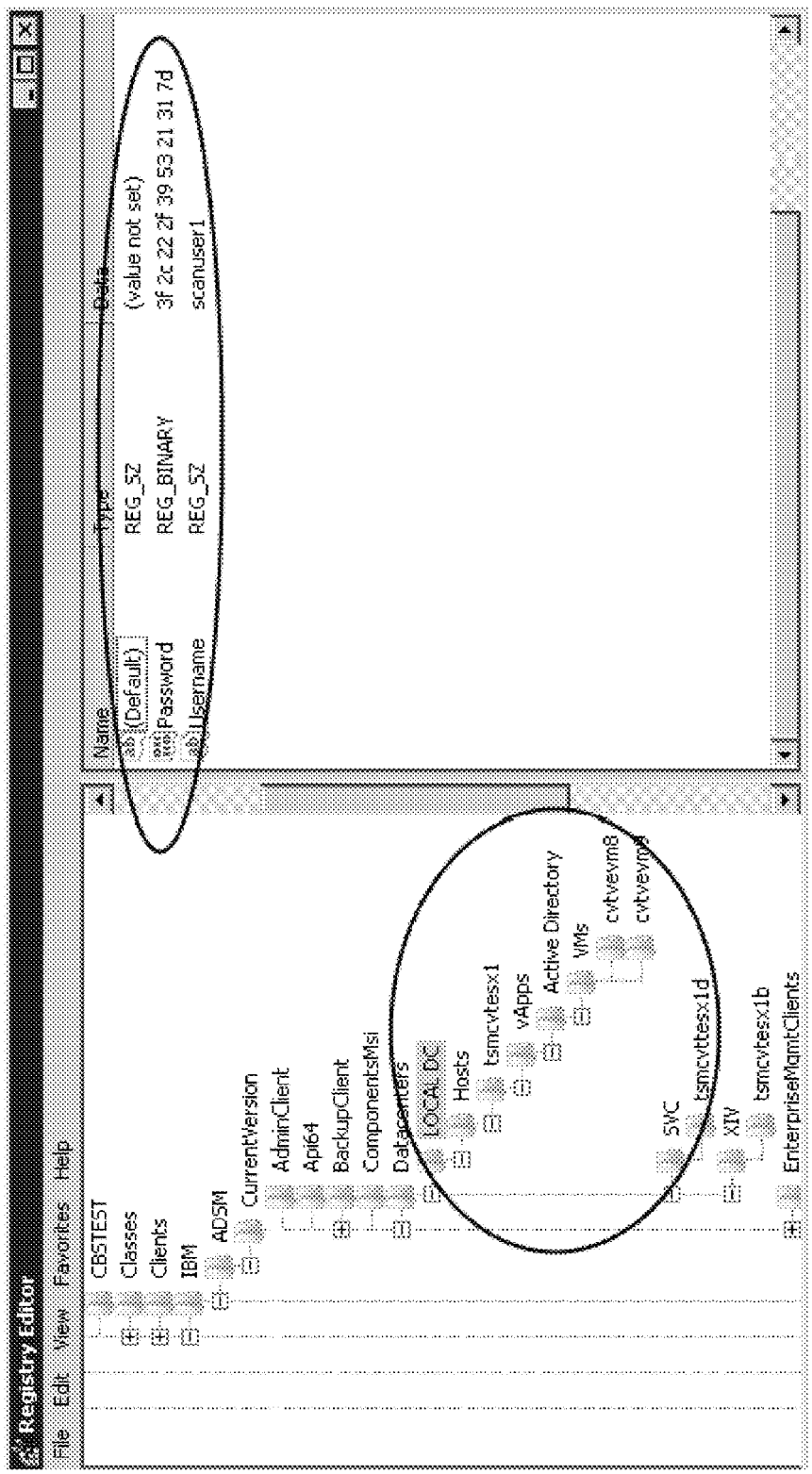
FIG. 7 depicts an exemplary GUI displayed by a backup data reporting agent showing a recreated resource hierarchy that includes Password Management Attributes, according to various embodiments of the present invention.

The Password Management Attribute and resource hierarchy information may be subsequently utilized to reconstruct the Password Management Attribute information at the server client 270. The server client 270 saves the information in the credential management repository. FIG. 7 depicts an exemplary view of the recreated resource hierarchy including Password Management Attributes upon a GUI of server client 270. A user name, "scanuser1" and encrypted password are saved under a registry key "Active Directory," under LOCAL_DC→Hosts→tsmcvtesx1→vApps. When reporting agent 272 is requested to initiate operations to any guest machine 220 (e.g. guest machine 220 named "cvtvevm8," etc.), client 270 queries the management server 250 for information associated with the particular guest machine 220. For example, client 270 may query management server 250 to determine where the guest machine 220 is located in the management server 250 inventory: e.g. LOCAL_DC→Hosts→tsmcvtesx1→vApps→Active Directory. Further, client 270 may query management server 250 to determine all of or some of the custom attributes associated with the guest machine 220: e.g. Password_Domain: Password_Domain_Scope=vApp and Password_Domain_Name, Active Directory. Subsequent to the query, server client 270 may determine e.g. that the username and password for guest machined 220 "cvtvevm8" can be found in the registry stored in the credential management repository under registry key "Active Directory".

FIG. 8 depicts exemplary custom attributes for various Password Management Attribute password domain/grouping cases. As shown in FIG. 8, a password, credential, etc. associated with a Password Management Attribute may be assigned to a datacenter (e.g. virtual server environment 202, etc.) a cluster or group of guest machines 220 within virtual server environment 202, a host machine 210, a particular application (vApp) running upon a guest machine 220, a resource pool of guest machines 220, a user-defined sub group, or a particular guest machine 220, etc. Further, as shown in FIG. 8 custom attributes such as Password Management Attributes: "Password_Domain_Scope . . . " and "Password_Domain_Name . . . " may be associated with the application management server 250 resource hierarchy product. If further sub-groups are desired in the resource hierarchy, additional custom attributes may be set e.g. by utilizing exemplary GUI associated with backup data reporting agent 272 upon server client 270.

Figure 9:
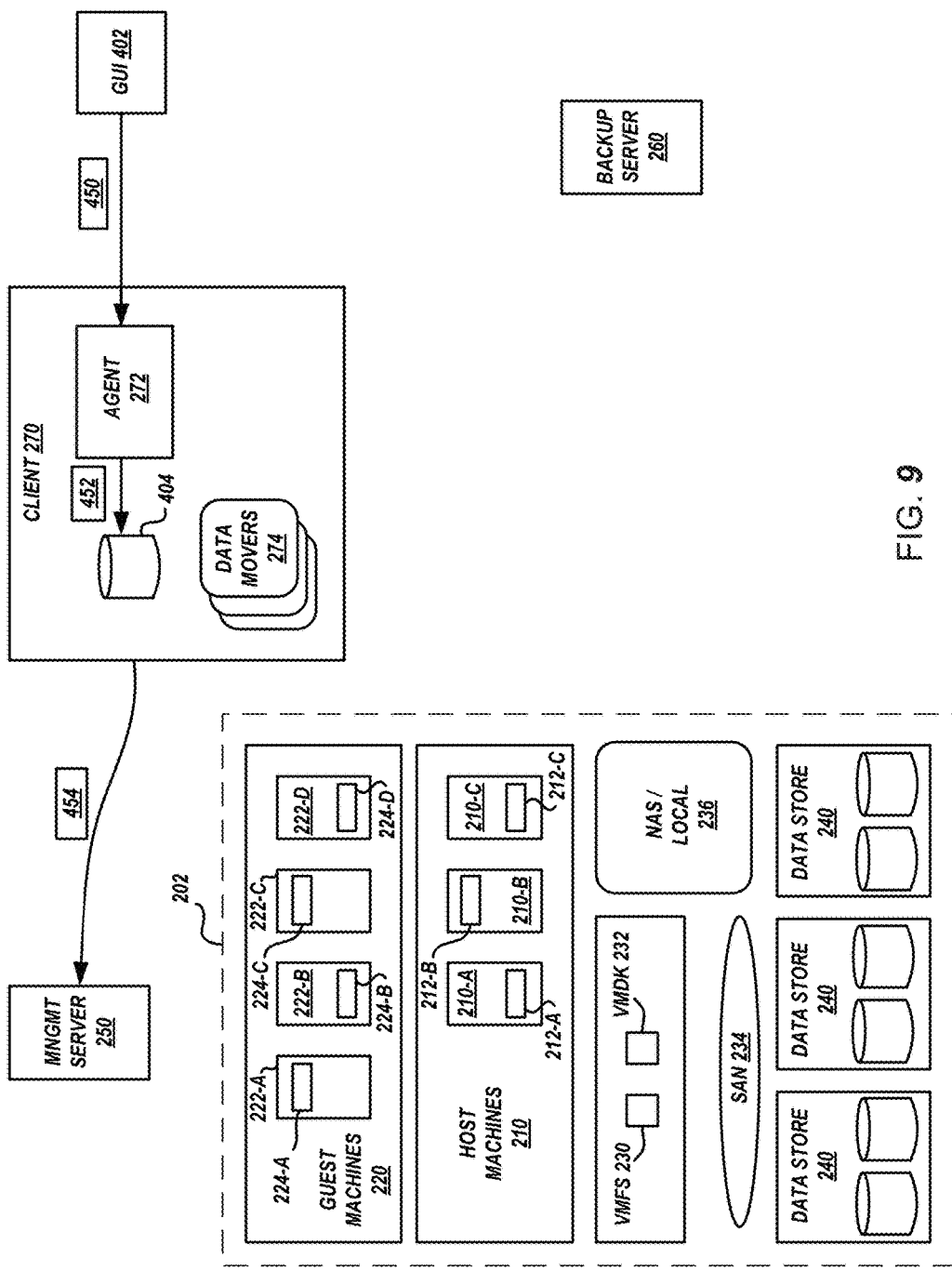
FIG. 9 depicts an execution flow of guest machine Password Management Attribute handling in an exemplary implementation, according to various embodiments of the present invention.

FIG. 9 depicts an execution flow diagram of guest machine 220 password configuration handling in an exemplary implementation. Upon a GUI 402 associated with reporting application 272 and/or server client 270 a user may specify Password Management Attributes such as password domain scope and password domain name. The user may also specify a username and password associated with the Password Management Attributes. At block 450 the password specified upon the GUI 402 is sent to reporting application 272. At block 452 the password specified upon the GUI 402 is saved in credential management repository 404. In certain embodiments, the specified username and the password is saved in credential management repository 404. In certain embodiments, the password may be encrypted and stored in credential management repository 404. At block 454 the management server 250 synchronizes with the server client 270 to transfer the Password Management Attributes to management server 250. For instance, data movers 274 may transfer the specified information stored in credential management repository 404 to management server 250.

Figure 10:
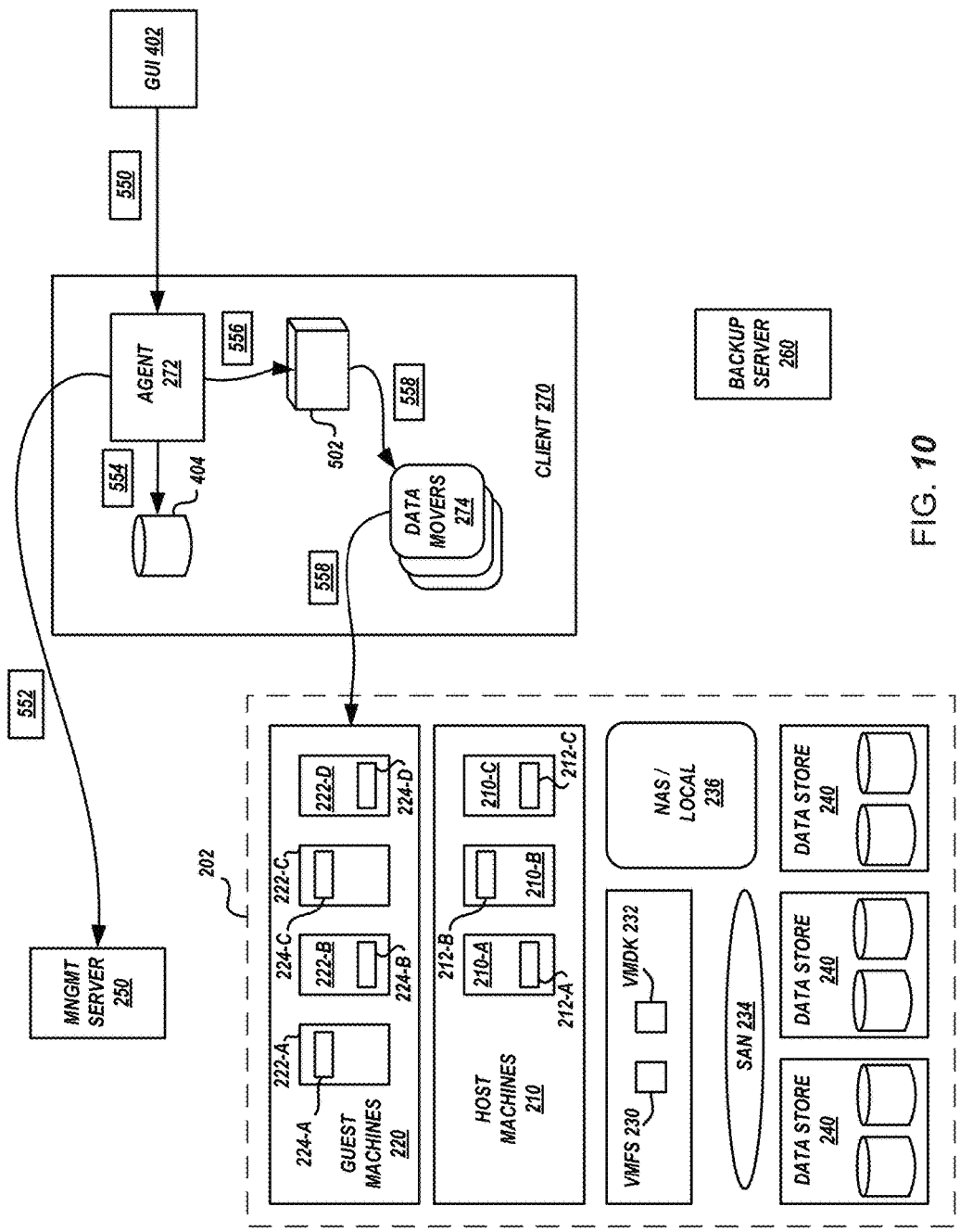
FIG. 10 depicts an execution flow of guest machine Password Management Attribute handling prior to guest machine operations, according to various embodiments of the present invention.

FIG. 10 depicts an execution flow diagram of guest machine 220 password configuration handling prior to guest machine 220 operations. Upon GUI 402 the user may schedule a data scan or backup associated with one or more guest machines 220. At block 550 program instructions start or otherwise set the scheduled data protection operation. At block 552, the server client 270 obtains guest machine(s) 220 locations within the resource hierarchy of management server 250. Also at block 552 server client 270 obtains Password Management Attributes associated with the guest machine(s) 220. At block 554, the server client 270 utilizes management server 250 resource hierarchy information and custom attribute(s) (e.g. Password Management Attributes, etc.) to find the user name and encrypted password of the associated guest machine 220 in the internal credential management repository 404. At block 556, the server client 270 creates a credential object 502. The credential object 502 may include the guest machine 220 name or other guest machine 220 identifier, a session key, a user name, and/or a password. At block 558, the credential object 502 is passed by data movers 274 so as to evoke one or more data protection agents (off-host data protection agent(s), on-host data protection agents, and/or in-guest data protection agents). In such a manner, a unified and holistic view of the backup data associated with various data protection agents may be centrally managed.

FIG. 11 depicts an exemplary GUI showing additional custom attributes, Agents Installed, Applications Installed, Injected Program Name, Injected Program Version, etc. that were created and stored in management server 250. Server client 270 (e.g. reporting agent 272, etc.) can access these custom attributes to generate reports. For example, server client 270 can retrieve the Injected Program Name and Injected Program Version attributes to determine if a newer version of program instructions should be injected to one or more guest machines 220, host machine 210, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method for managing in-guest data backup agents, in-host data backup agents, and off-host data backup agents within a virtualized computing environment comprising a plurality of computing resources, the method comprising:
receiving, at a client of a management server (management server client), a first Correlation Globally Unique Identifier (GUID) Attribute associated with a GUID of a first guest machine, wherein the first Correlation GUID Attribute is one or more bits that when active indicates the GUID of the first guest machine is the same as a GUID associated with a second guest machine;
determining, by the management server client, that the first Correlation GUID Attribute of the first guest machine is active and subsequently assigning a new GUID and associated new Correlation GUID Attribute to the first guest machine;
receiving, at the management server client, a request for data backup operations associated with the first guest machine;
receiving, at the management server client, Password Management Attributes and hierarchy location information associated with the first guest machine;
subsequent to receiving the request for data backup operations associated with the first guest machine, querying, by the management server client, a credential repository to determine the new GUID, the new Correlation GUID Attribute, and a password associated with the first guest machine;
creating, by the management server client, a Credential Object comprising the new GUID, the new Correlation GUID Attribute of the first guest machine, and the password associated with the first guest machine;
determining, by the management server client, whether the first guest machine is backed up by at least one member of the group consisting of an in-guest data backup agent that backs up data of the first guest machine and is located within the first guest machine, an in-host data backup agent that backs up data of the first guest machine and is located within a first physical server that hosts the first guest machine, and an off-host data backup agent that backs up data of the first guest machine and is located within a second physical server that does not host the first guest machine;
sending, by the management server client, the Credential Object to the determined at least one member of the group consisting of the in-guest data backup agent, the in-host data backup agent, and the off-host data backup agent, if the new Correlation GUID Attribute is inactive; and
upon receipt of the Credential Object, backing up data of the first guest machine at the determined at least one member of the group consisting of the in-guest data backup agent, the in-host data backup agent, and the off-host data backup agent.

2. The method of claim 1, further comprising:
synchronizing, by the management server client, the credential repository with a computing resources hierarchy stored within the management server.

3. A computer program product for managing in-guest data backup agents, in-host data backup agents, and off-host data backup agents within a virtualized computing environment comprising one or more host machines and one or more guest machines, the computer program product comprising a computer readable storage medium having program instructions embodied therewith, the program instructions readable by one or more processors of the virtualized computing environment, to cause the virtualized computing environment to:
receive, at a client of a management server (management server client), a first Correlation Globally Unique Identifier (GUID) Attribute associated with a GUID of a first guest machine, wherein the first Correlation GUID Attribute is one or more bits that when active indicates the GUID of the first guest machine is the same as a GUID associated with a second guest machine;
determine, by the management server client, that the first Correlation GUID Attribute of the first guest machine is active and subsequently assign a new GUID and associated new Correlation GUID Attribute to the first guest machine;
receive, at the management server client, a request for data backup operations associated with the first guest machine;
receive, at the management server client, Password Management Attributes and computing resources hierarchy location information associated with the first guest machine;
subsequent to the receipt of the request for data backup operations associated with the first guest machine, query, by the management server client, a credential repository to determine the new GUID, the new Correlation GUID Attribute, and a password associated with the first guest machine;
create, by the management server client, a Credential Object comprising the new GUID, the new Correlation GUID Attribute, and the password associated with the first guest machine;
determine, by the management server client, whether the first guest machine is backed up by at least one member of the group consisting of an in-guest data backup agent that backs up data of the first guest machine and is located within the first guest machine, an in-host data backup agent that backs up data of the first guest machine and is located within a first physical server that hosts the first guest machine, and an off-host data backup agent that backs up data of the first guest machine and is located within a second physical server that does not host the first guest machine;
send, by the management server client, the Credential Object to the determined at least one member of the group consisting of the in-guest data backup agent, the in-host data backup agent, and the off-host data backup agent if the new Correlation GUID Attribute is inactive; and
upon receipt of the Credential Object, back up data of the first guest machine at the determined at least one member of the group consisting of the in-guest data backup agent, the in-host data backup agent, and the off-host data backup agent.

4. The computer program product of claim 3, wherein the program instructions are readable by the processor to further cause the virtualized computing system to:
synchronize, by the management server client, the credential repository with a computing resources hierarchy stored within the management server.

5. A system for managing in-guest data backup agents, in-host data backup agents, and off-host data backup agents within a virtualized computing environment comprising one or more host machines and one or more guest machines, the system comprising:
- a computer processor of a client of a management server (management server client) that:
- receives a first Correlation Globally Unique Identifier (GUID) Attribute associated with a GUID of a first guest machine, wherein the first Correlation GUID Attribute is one or more bits that when active indicates the GUID of the first guest machine is the same as a GUID associated with a second guest machine;
- determines that the first Correlation GUID Attribute of the first guest machine is active and subsequently assigns a new GUID and an associated new Correlation GUID Attribute to the first guest machine;
- receives a request for data backup operations associated with the first guest machine;
- receives Password Management Attributes and hierarchy location information associated with the first guest machine;
- subsequent to receiving the request for data backup operations associated with the first guest machine, queries a credential repository to determine the new GUID, the new Correlation GUID Attribute, and a password associated with the first guest machine;
- creates a Credential Object comprising the new GUID, the new Correlation GUID Attribute, and the password associated with the first guest machine;
- determines whether the first guest machine is backed up by at least one member of the group consisting of an in-guest data backup agent that backs up data of the first guest machine and is located within the first guest machine, an in-host data backup agent that backs up data of the first guest machine and is located within a first physical server that hosts the first guest machine, and an off-host data backup agent that backs up data of the first guest machine and is located within a second physical server that does not host the first guest machine; and
- sends the Credential Object to the determined at least one member of the group consisting of the in-guest data backup agent, the in-host data backup agent, and the off-host data backup agent, if the new Correlation GUID Attribute is inactive;
- wherein upon receipt of the Credential Object, data of the first guest machine is backed up at the determined at least one member of the group consisting of the in-guest data backup agent, the in-host data backup agent, and the off-host data backup agent.

6. The system of claim 5, wherein the management server client further:
- synchronizes the credential repository with a computing resources hierarchy stored within the management server.

* * * * *